(12) United States Patent
Hamakawa

(10) Patent No.: US 10,432,265 B2
(45) Date of Patent: Oct. 1, 2019

(54) ELECTRONIC APPARATUS AND NON-TRANSITORY COMPUTER-READABLE RECORDING MEDIUM FOR POWER SUPPLY CONTROL

(71) Applicant: KYOCERA Document Solutions Inc., Osaka (JP)

(72) Inventor: Takeshi Hamakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/810,004

(22) Filed: Nov. 10, 2017

(65) Prior Publication Data

US 2018/0131409 A1 May 10, 2018

(30) Foreign Application Priority Data

Nov. 10, 2016 (JP) .................. 2016-219702

(51) Int. Cl.
*G06F 1/3234* (2019.01)
*H04M 1/725* (2006.01)
*H04W 52/02* (2009.01)
*H04W 4/80* (2018.01)
*H04B 5/00* (2006.01)
(Continued)

(52) U.S. Cl.
CPC ......... *H04B 5/0031* (2013.01); *G06F 1/3284* (2013.01); *H04L 63/083* (2013.01); *H04M 1/7253* (2013.01); *H04W 52/02* (2013.01); *B41J 29/38* (2013.01); *B41J 29/393* (2013.01); *H04L 12/12* (2013.01); *H04W 4/80* (2018.02); *H04W 12/06* (2013.01)

(58) Field of Classification Search
None
See application file for complete search history.

(56) References Cited

U.S. PATENT DOCUMENTS

2014/0323053 A1* 10/2014 Yamaoka .......... H04W 52/0229
455/41.2
2014/0340698 A1* 11/2014 Baba .................... H04B 5/0056
358/1.13
(Continued)

FOREIGN PATENT DOCUMENTS

CN          105991887 A        10/2016
JP         2005-131872 A         5/2005
(Continued)

OTHER PUBLICATIONS

China National Intellectual Property Administration. Office Action of foreign counterpart. Dated Feb. 2, 2019.

*Primary Examiner* — Miya J Williams
(74) *Attorney, Agent, or Firm* — Hawaii Patent Services; Nathaniel K. Fedde; Kenton N. Fedde

(57) ABSTRACT

Provided is an electronic apparatus that prevents leakage of confidential documents and the like that are stored in a storage device. When there is writing of power-supply-mode-switch-request information that is included in a Write request from a user-authenticated portable terminal to an NFC tag, a system-control unit instructs a power-supply-control unit to switch to a normal mode based on the power-supply-mode-switch-request information, and when the portable terminal is separated from the NFC tag, instructs the power-supply-control unit to return to the power-supply mode before the instruction.

5 Claims, 4 Drawing Sheets

(51) Int. Cl.
    *H04L 29/06*     (2006.01)
    *H04W 12/06*    (2009.01)
    *B41J 29/38*     (2006.01)
    *B41J 29/393*    (2006.01)
    *H04L 12/12*     (2006.01)

(56) References Cited

U.S. PATENT DOCUMENTS

| | | |
|---|---|---|
| 2015/0049206 A1 | 2/2015 | Eshita |
| 2015/0169027 A1* | 6/2015 | Akiba ................... G06F 1/3209 713/320 |
| 2015/0189112 A1* | 7/2015 | Misumi ............. H04N 1/00888 358/1.14 |
| 2015/0278564 A1 | 10/2015 | Naruse |
| 2016/0080590 A1* | 3/2016 | Shimizu ................ G06F 3/1204 358/1.15 |
| 2016/0156830 A1 | 6/2016 | Eshita |
| 2016/0277619 A1* | 9/2016 | Asai ................... H04N 1/00896 |
| 2016/0307007 A1* | 10/2016 | Narasimha ............ H04W 12/06 |
| 2016/0307011 A1* | 10/2016 | Narasimha .......... H04M 1/7253 |

FOREIGN PATENT DOCUMENTS

| | | |
|---|---|---|
| JP | 5527492 B | 6/2014 |
| JP | 2016-175227 A | 10/2016 |
| WO | 2014057634 A1 | 4/2014 |

* cited by examiner

ELECTRONIC APPARATUS AND NON-TRANSITORY COMPUTER-READABLE RECORDING MEDIUM FOR POWER SUPPLY CONTROL

INCORPORATION BY REFERENCE

This application is based on and claims the benefit of priority from Japanese Patent Application No. 2016-219702 filed on Nov. 10, 2016, the contents of which are hereby incorporated by reference.

BACKGROUND

The present disclosure relates to an electronic apparatus that is suited for power-supply control, and to a non-transitory computer-readable recording medium.

An image forming apparatus is, for example, a MFP (Multifunction Peripheral) such as a printer, multifunction printer, combination apparatus and the like. In an image forming apparatus, for example, a wireless tag such as a NFC (near field radio communication) tag may be installed that stores wired or wireless connection information necessary for connecting to a network, apparatus information such as the apparatus name and the like. It is possible for an image forming apparatus to write various kinds of information to or read various kinds of information from a wireless tag, however, a portable terminal such as a smart phone that is equipped with a Reader/Writer function may also be able to write various kinds of information to or read various kinds of information from a wireless tag.

In typical technology, as a apparatus that uses this kind of wireless tag includes a non-contact communication unit that performs non-contact communication with an external apparatus, and a control unit that controls turning ON/OFF the power supply and controls an imaging preparation operation. Moreover, an imaging apparatus is proposed in which the control unit performs control for turning ON the power supply when a polling command that is transmitted from an external apparatus by non-contact communication is detected. After the power-supply is turned ON, the control unit transmits connection information to the external apparatus for performing a wireless communication connection with the external apparatus. When transmission of the connection information is complete, the control unit performs control so that an imaging preparation operation is performed.

SUMMARY

The electronic apparatus according to an embodiment of the present disclosure includes a wireless tag, a power-supply-control unit and a system-control unit. The wireless tag stores information. The power-supply-control unit controls a power-supply mode. The system-control unit instructs the power-supply-control unit to switch the power-supply mode based on the information. When there is writing of power-supply-mode-switch-request information that is included in a Write request from a user-authenticated portable terminal to the wireless tag, the system-control unit instructs the power-supply-control unit to switch to a normal mode based on the power-supply-mode-switch-request information. Then when the portable terminal is separated from the wireless tag, the system-control unit instructs the power-supply-control unit to return to the power-supply mode before the instruction.

The non-transitory computer-readable recording medium according to an embodiment of the present disclosure includes a power-supply-control program executable by a computer that controls an electronic apparatus inclusing a power-supply-control unit that controls a power-supply mode. The power-supply-control program has: a first program code that causes the computer to store information in a wireless tag; and a second program code that causes the computer to instruct the power-supply-control unit to switch the power-supply mode based on the information. The second program code, when there is writing of power-supply-mode-switch-request information that is included in a Write request from a user-authenticated portable terminal to the wireless tag, causes the computer to instruct the power-supply-control unit to switch to a normal mode based on the power-supply-mode-switch-request information. Then, when the portable terminal is separated from the wireless tag, the third program code causes the computer to instruct the power-supply-control unit to return to the power-supply mode before the instruction.

DETAILED DESCRIPTION

In the following, an embodiment of an electronic apparatus according to the present disclosure will be explained with reference to FIG. 1 to FIG. 4. In the following explanation, an MFP (Multifunction Peripheral) that is a combination peripheral apparatus equipped, for example, with a printing function, a copying function, a FAX function, a data transmitting and receiving function via a network and the like is used as an example of an electronic apparatus.

Figure 1:
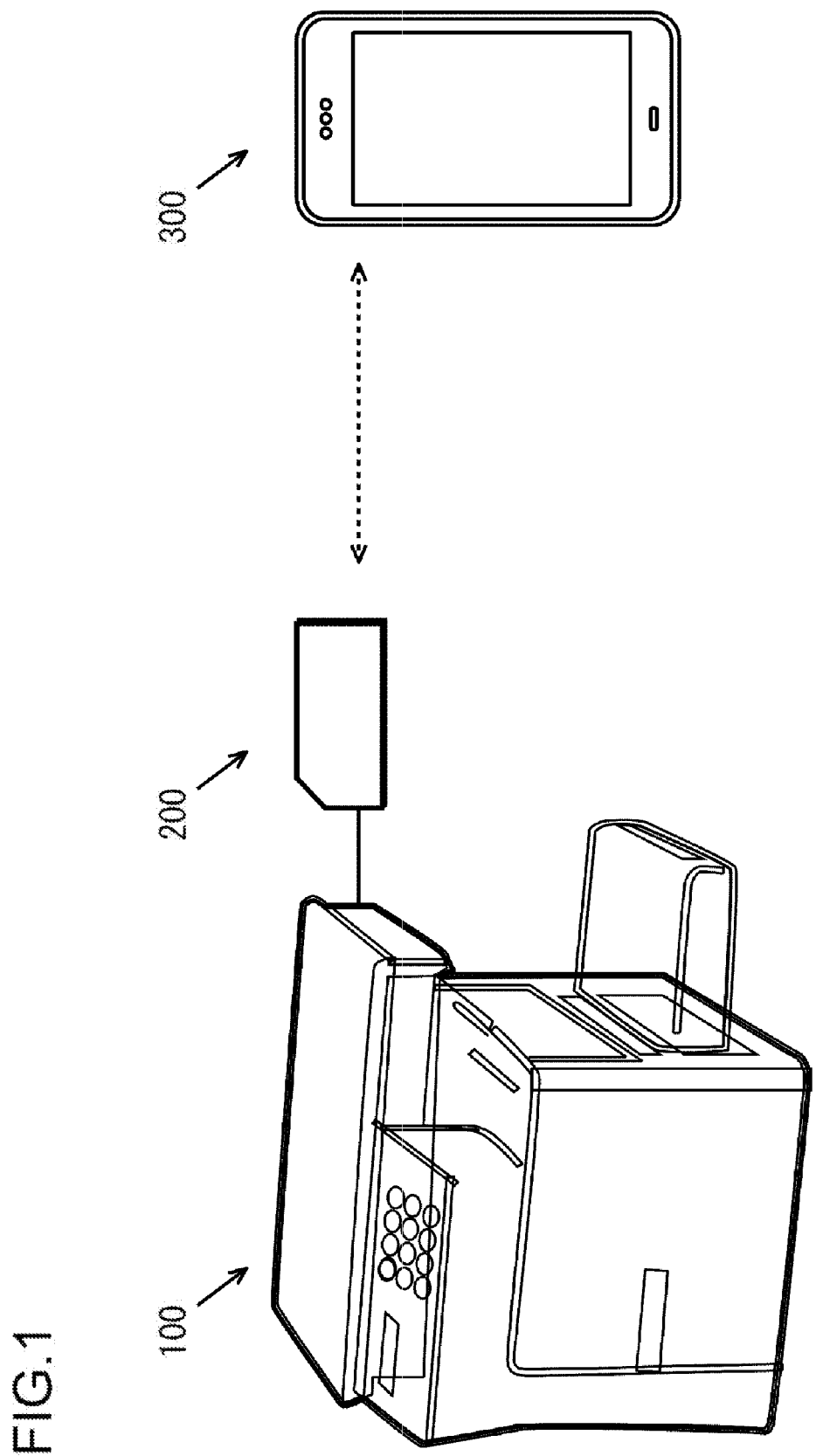
FIG. 1 illustrates an embodiment when the electronic apparatus according to the present disclosure is applied to an MFP.

First, as illustrated in FIG. 1, the MFP 100 has a NFC (Near Field Communication) tag 200 as a wireless tag. In FIG. 1, the reference number 300 indicates a portable terminal. Here, the NFC tag 200 is connected to the MFP 100 by a wired connection (serial bus such as a 12C bus or the like). Moreover, the NFC tag 200 is wirelessly connected to the portable terminal 300.

Power supply-mode information that indicates the current power supply mode that is written by the MFP is written in the NFC tag 200, for example. The power-supply-mode information, for example, includes contents that indicate whether the power-supply mode is a power-saving mode or power-supply OFF mode. Moreover, password-authentication information that is included in a Read request with password authentication from the portable terminal 300, or power-supply-mode-switch-request information that is included in a Write request that is transmitted after a Read request is written, for example in the NFC tag 200. The Write request may also have password authentication. The password-authentication information includes a user ID (identification) and a password. Password-authentication information may include unique information and the like about the portable terminal 300. Moreover, power-supplymode-switch-request information includes contents and the like that indicate a power-saving-cancellation request, or a power-supply-ON request.

The portable terminal 300 is equipped with an NFC application that makes possible an NFC Reader/Writer function (hereafter, referred to as an NFC function) that performs reading information that is stored in the NFC tag 200, and writing information to the NFC tag 200 by wireless communication. The NFC application has password-authentication information described above that includes a user ID and password. Moreover, as the portable terminal 300, it is possible to use a smart phone, tablet, notebook computer and the like in which an NFC function can be installed.

Figure 2:
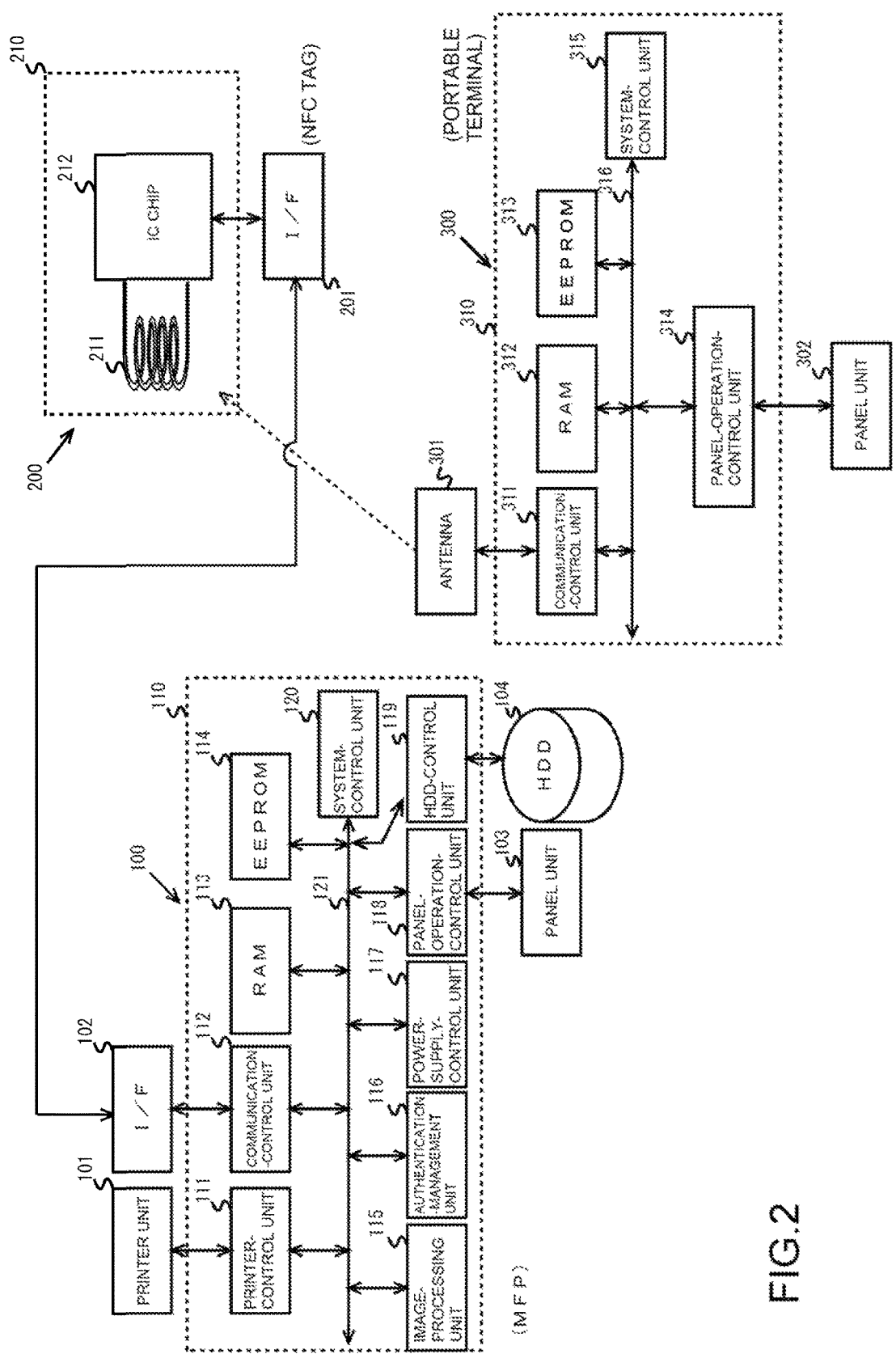
FIG. 2 illustrates an example of configuration of the MFP, NFC tag and portable terminal in FIG. 1.

Next, an example of configuration of the MFP 100, NFC tag 200 and portable terminal 300 will be explained with reference to FIG. 2. First, the MFP 100 includes a control unit 110 that controls a printer unit 101, an I/F (interface) 102, a panel unit 103, and a HDD 104. The MFP 100 may also include a scanner unit, a FAX unit and the like.

The printer unit 101 is a device that prints an image on paper based on printing data that is outputted from the control unit 110. The I/F 102 takes charge of communication with the NFC tag 200. The I/F 102 may also take charge of communication with the portable terminal 300 via a network such as a LAN (Local Area Network) or the like. Moreover, the I/F 102 may also take charge of communication with a content server, web server and the like. The panel unit 103, for example, is a device that has hardware keys and a touch panel for performing a display for the printing function, copying function, FAX function, data transmitting and receiving function via a network, and various settings of the MFP 100. The HDD 104 is a storage device for storing application programs for providing the various functions of the MFP 100. Moreover, the HDD 104 has user boxes for storing printing jobs that are registered from a user terminal, for example.

The control unit 110 is a processor for controlling the overall operation of the MFP 100 by executing an image forming program, a control program and the like. The control unit 110 includes a printer-control unit 111, a communication-control unit 112, a RAM 113, an EEPROM (Electrically Erasable Programmable Read-Only Memory) 114, an image-processing unit 115, an authentication-management unit 116, a power-supply-control unit 117, a panel-operation-control unit 118, a HDD-control unit 119, and a system-control unit 120. Moreover, these units are connected to a data bus 121.

The printer-control unit 111 controls the printing operation of the printer unit 101. The communication-control unit 112, via the I/F 102, performs control of transmitting and receiving with the NFC tag 200 and the like. The RAM 113 is a work memory for executing programs. The EEPROM 114 stores a control program for performing operation checks of each of the units and the like. The image-processing unit 115, for example, performs image processing (rasterization) of printing jobs that are registered in the user boxes of the HDD 104. The system-control unit 120 causes printing data that has undergone image processing by the image-processing unit 115 to be stored temporarily in RAM 113.

The authentication-management unit 116, for example, performs user authentication by comparing password-authentication information that includes a user ID and password, with, for example, password-authentication information that is registered in the HDD 104. The power-supply-control unit 117, based on an instruction from the system-control unit 120, switches the power supply from a normal mode to a power-saving mode or power-supply OFF mode. Moreover, the power-supply control unit 117, based on an instruction from the system-control unit 120, switches the power supply from the power-saving mode or power-supply-OFF mode to the normal mode. Here, the power-saving mode, for example, includes a low-power mode in which, when there is no operation during a set amount of time, reduces the power consumption by stopping the power supply to the panel unit 103 (for example, touch panel) and the like, a sleep mode in which the power consumption is less than in the low-power mode, and the like. Moreover, the power-supply-OFF mode is a mode that stops supplying power to parts other than at least the system-control unit 120 of the control unit 110. The normal mode is a mode in which power is supplied to each of the parts, and the functions of the MFP 100 can be used. The panel-operation-control unit 118 controls the display operation of the panel unit 103. Furthermore, the panel-operation-control unit 118, via the panel unit 103, receives the start setting and the like for printing, copying, a FAX, data transmitting and receiving via a network and the like. The panel-operation-control unit 118 also, via the panel unit 103, receives a selection for the power-saving mode or power-supply-OFF mode.

The system-control unit 120 controls linked operations of each unit. Moreover, when the power-saving mode or the power-supply-OFF mode is selected (may also be when the low-power mode or sleep mode is selected of the power-saving mode) via the panel unit 103, the system-control unit 120 instructs the power-supply-control unit 117 to switch to the power-saving mode or power-supply-OFF mode. Moreover, when there is a Read request from the portable terminal 300 for reading the NFC tag 200, the system-control unit 120 instructs the authentication-management unit 116 to perform user authentication of the password-authentication information that is included in the Read request. Moreover, when the authentication-management unit 116 is successful in performing user authentication, the system-control unit 120 acquires the current power-supply mode from the power-supply-control unit 117, and writes that power-supply mode to the NFC tag 200. The current power-supply mode indicates whether the mode is the power-saving mode or the power-supply-OFF mode. Moreover, when contents indicating a power-saving-cancellation request or power-supply-ON request that is included in the Write request is written to the NFC tag 200 by the portable terminal 300, the system-control unit 120 instructs the power-supply-control unit 117 to switch to power-saving cancellation or power-supply ON. Furthermore, when there are no radio waves from the portable terminal 300 via the NFC tag 200 during a set amount of time, the system-control unit 120 instructs the power-supply-control unit 117 to return the mode to the power-supply mode before switching to the normal mode. In other words, when the power-supply mode before switching to the normal mode is the low-power mode or the sleep mode, the system-control unit 120 instructs the power-supply-control unit 117 to return to the low-power mode or sleep mode from the normal mode. Moreover, when the power-supply mode before switching to the normal mode is the power-supply-OFF mode, the system-control unit 120 instructs the power-supply-control unit 117 to return to the power-supply-OFF mode from the normal mode.

The NFC tag 200 includes a control unit 210 that controls the I/F 201. The I/F 102 takes charge of communication with the MFP 100. The control unit 210 has an antenna unit 211 and an IC chip 212. The antenna unit 211 performs communication with the portable terminal 300 by using a specified frequency (for example 13.56 MHz). The IC chip 212 has a nonvolatile memory that stores information that is written by the MFP 100 or portable terminal 300. Moreover, the IC chip 212 writes information received via the I/F 201 or antenna unit 211 to the nonvolatile memory, or transmits information of the nonvolatile memory via the I/F 201 or antenna unit 211. The information of the nonvolatile memory is written in a format that is defined by the NFC standard.

The portable terminal 300 includes a control unit 310 that controls an antenna 301 and a panel unit 302. The antenna 301 emits radio waves, and takes charge of communication with the NFC tag 200 and the like. Moreover, the antenna 301, via a network, takes charge of communication with the MFP 100, content server, web server or the like. The panel unit 302 is a device such as a touch panel or the like for performing selection of the various functions of the portable terminal 300, input of characters, information display and the like.

The control unit 310 is a processor that controls the overall operation of the portable terminal 300 by executing application programs, a control program and the like. The control unit 310 includes a communication-control unit 311, a RAM 312, an EEPROM 313, a panel-operation-control unit 314, and a system-control unit 315. Moreover, these units are connected to a data bus 316.

The communication-control unit 311 performs control of transmission or reception of the NFC tag 200, MFP 100 or the like via the antenna 301. The RAM 312 is a work memory for executing programs. The EEPROM 313 stores a control program for performing operation checks and the like of each of the units. The EEPROM 313 also stores NFC applications and the like for realizing the NFC functions described above of reading information that is stored in an NFC tag 200 or writing information to an NFC tag 200 by wireless communication, for example. An NFC application has user identification information that includes a user ID and password as described above. The panel-operation-control unit 314 controls the display operation and the like of the panel unit 302.

The system-control unit 315 controls linked operation and the like of each of the units. Moreover, when the NFC function is selected via the panel unit 302, the system-control unit 315 activates the NFC application and transmits radio waves to the communication-control unit 311 from the antenna 301. The system-control unit 315 also, according to a Read request by the NFC application, acquires information that is written in the NFC tag 200. Furthermore, the system-control unit 315, according to a Write request by the NFC application, writes information to the NFC tag 200.

Figure 3:
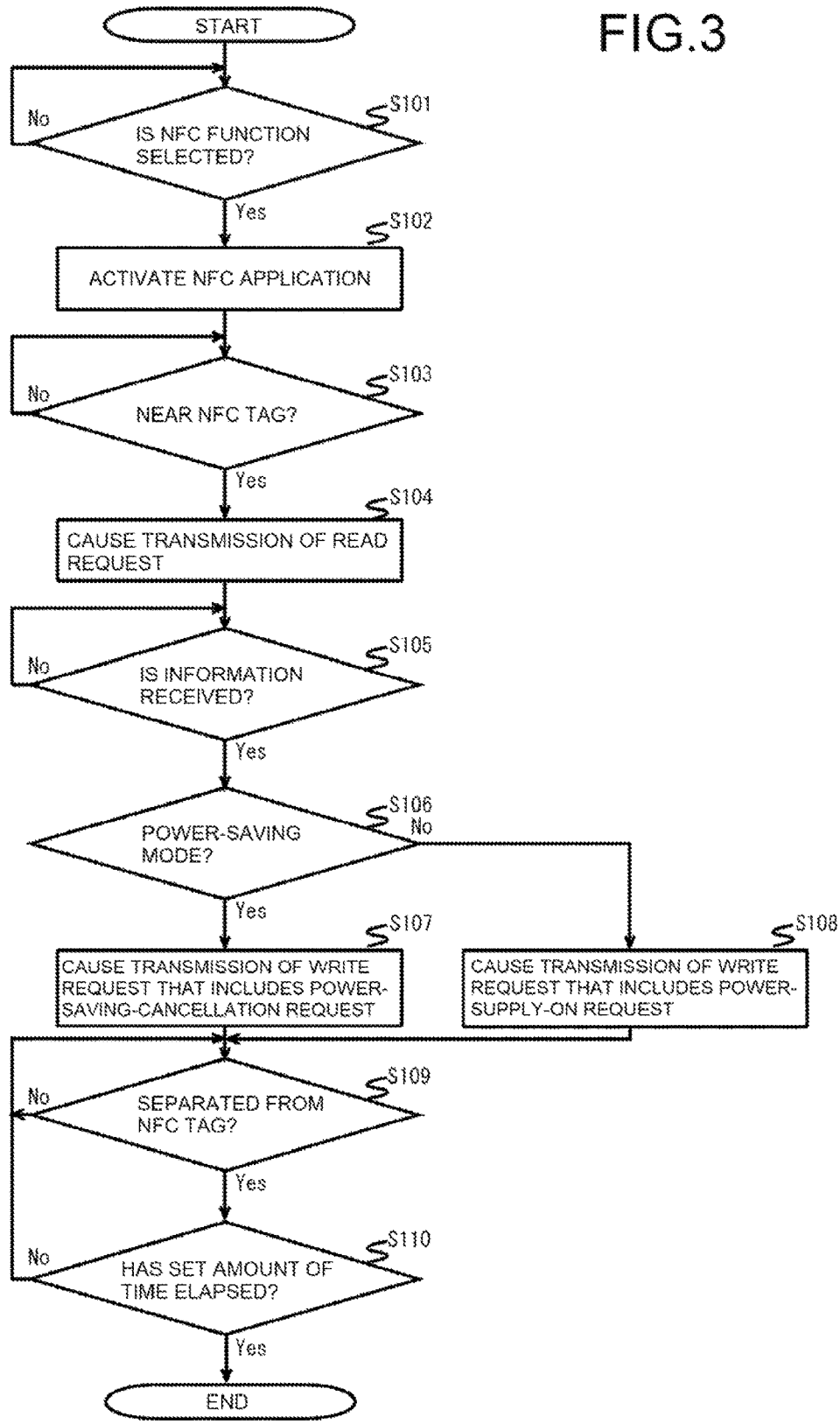
FIG. 3 illustrates steps of processing on the portable terminal side in FIG. 1.

Next, processing on the portable terminal side 300 will be explained with reference to FIG. 3. In the following explanation it is presumed that after the user selects the NFC function of the portable terminal 300, the portable terminal 300 is set in a position over the NFC tag 200. In this case, a holder, hook or the like is provided around the NFC tag 200, for example, and by setting the portable terminal 300 in that holder or on that hook, it is possible to maintain a state in which the portable terminal 300 is over the NFC tag 200. Moreover, in the following, it is presumed that the information that is written in the NFC tag 200 is the power-saving mode or power-supply-OFF mode that indicates the current power-supply mode of the MFP 100 side.

(Step S101)
The system-control unit 315 determines whether or not the NFC function is selected.

In this case, when there is no notification from the panel-operation-control unit 314 indicating that the NFC function is selected via the panel unit 302, the system-control unit 315 determines that the NFC function is not selected (step S101: NO).

However, when there is a notification from the panel-operation-control unit 314 indicating that the NFC function is selected via the panel unit 302, the system-control unit 315 determines that the NFC function is selected (step S101: YES), and processing moves to step S102.

(Step S102)
The system-control unit 315 activates the NFC function.

In this case, the system-control unit 315 reads the NFC application that is stored in the EEPROM 313. Moreover, the system-control unit 315 confirms the password-authentication information of the NFC application that includes a user ID and a password.

(Step S103)
The system-control unit 315 determines whether or not the antenna 301 is near the NFC tag 200.

In this case, when the measurement result that indicates the distance of the distance sensor is a set value or greater, the system-control unit 315 determines that the antenna 301 is not near the NFC tag 200 (step S103: NO).

However, when the measurement result that indicates the distance of the distance sensor is less than a set value, the system-control unit 315 determines that the antenna 301 is near the NFC tag 200 (step S103: YES), and processing moves to step S104.

The communication distance between the portable terminal 300 and the NFC tag 200 is less than 10 cm, so the position where the portable terminal 300 is held over the NFC tag should be less than 10 cm.

Moreover, the system-control unit 315 may determine whether or not the portable terminal 300 is near the NFC tag 200 without using the distance sensor by whether or not a response is received from the NFC tag 200. In this case, the system-control unit 315 transmits response requests at set intervals (for example, 10 second intervals) using radio waves from the antenna 301 to the communication-control unit 311 for checking the wireless communication connection. The system-control unit 315 may determine that the portable terminal 300 is near the NFC tag 200 when a response is received from the NFC tag 200. In addition to this, determining whether or not the antenna 301 is near the NFC tag 200 can be performed using a known method for near-field wireless communication.

(Step S104)
The system-control unit 315 transmits a Read request.

In this case, the system-control unit 315, using radio waves from the antenna 301, transmits a Read request that includes password-authentication information to the communication-control unit 311.

(Step S105)
The system-control unit 315 determines whether or not information is received.

In this case, when there is no notification from the communication-control unit 311 indicating that information written in the NFC tag 200 is received, the system-control unit 315 determines that information is not received (step S105: NO).

However, when there is a notification from the communication-control unit 311 indicating that information written in the NFC tag 200 is received, the system-control unit 315 determines that information is received (step S105: YES), and processing moves to step S106.

Here, the information that is written in the NFC tag 200 indicates the power-saving mode or power-supply-OFF mode as the current power-supply mode on the MFP 100 side described above.

(Step S106)

The system-control unit 315 determines whether or not the power-supply mode is the power-saving mode.

In this case, when the information that is written in the NFC tag 200 is the power-saving mode, the system-control unit 315 determines that the power-supply mode is the power-saving mode (step S106; YES), and processing moves to step S107.

However, when the information that is written in the NFC tag 200 is the power-supply-OFF mode, the system-control unit 315 determines that the power-supply mode is not the power-saving mode (step S106: NO), and processing moves to step S108.

(Step S107)

The system-control unit 315 causes a Write request that includes a power-saving-cancellation request to be transmitted.

In this case, the system-control unit 315 causes the communication-control unit 311 to transmit a Write request that includes a power-saving-cancellation request using radio waves from the antenna 301.

Password-authentication information may also be included in the Write request that includes a power-saving-cancellation request.

(Step S108)

The system-control unit 315 causes a Write request that includes a power-supply-ON request to be transmitted.

In this case, the system-control unit 315 causes the communication-control unit 311 to transmit a Write request that includes a power-supply-ON request using radio waves from the antenna 301.

Password-authentication information may also be included in the Write request that includes a power-supply-ON request.

(Step S109)

The system-control unit 315 determines whether or not the portable terminal 300 is separated from the NFC tag 200.

In this case, when the measurement result that indicates the distance of the distance sensor is less than a set value (for example, less than 10 cm), the system-control unit 315 determines that the portable terminal 300 is not separated from the NFC tag 200 (step S109: NO).

However, when the measurement result that indicates the distance of the distance sensor is equal to or greater than a set value (for example, 10 cm or greater), the system-control unit 315 determines that the portable terminal 300 is separated from the NFC tag 200 (step S109: YES), and processing moves to step S110.

(Step S110)

The system-control unit 315 determines whether or not a set amount of time has elapsed.

In this case, when the measured value of a timer that starts from the time when it is determined that the portable terminal 300 is separated from the NFC tag 200 is not greater than a set amount of time (for example, 20 seconds), the system control unit 315 determines that a set amount of time has not elapsed (step S110: NO).

However, when the measured value of a timer that starts from the time when it is determined that the portable terminal 300 is separated from the NFC tag 200 is greater than a set amount of time (for example, 20 seconds), the system control unit 315 determines that a set amount of time has elapsed (step S110: YES), and processing ends.

In this way, the system-control unit 315 ends processing after a set amount of time has elapsed from when it is determined that the portable terminal 300 is separated from the NFC tag 200. As a result, it is possible to avoid interrupting processing even when the portable terminal 300 is mistakenly separated from the NFC tag 200 and the portable terminal 300 is quickly returned to a position over the NFC tag 200.

In step S107 or step S108, the system-control unit 315 causes a Write request that includes a power-saving-cancellation request or a power-supply-ON request to be transmitted, however, it is possible to add an activation-mode request to the power-saving-cancellation request or power-supply-ON request. As the activation-mode request, for example, there are contents that give instruction to display a setting screen for checking settings or changing settings of the MFP 100. By adding this activation-mode request, it is possible during maintenance, for example, to immediately cause a setting screen for checking settings or changing settings to be displayed after the power-supply mode on the MFP 100 side becomes power-saving cancellation or power-supply ON, and thus a selection operation for selecting display of a setting screen is not necessary.

Next, processing on the MFP 100 side will be explained with reference to FIG. 4. In the following, the case will be explained in which, as described above, the portable terminal 300 is set in a position over the NFC tag 200 using a holder or hook that is provided in a position surrounding the NFC tag 200 in a state so that wireless communication with the NFC tag 200 is possible.

(Step S201)

The system-control unit 120 determines whether or not there is a Read request.

In this case, when the communication-control unit 112 has not received a notification signal from the NFC tag 200 that notifies when a state change occurs, the system control unit 120 determines that there is no Read request (step S201: NO).

However, when the communication-control unit 112 has received a notification signal from the NFC tag 200 that notifies when a state change occurs, the system control unit 120 determines that there is a Read request (step S201: YES), and processing moves to step S202.

A state change of the NFC tag 200 means that reading or writing information via the antenna unit 211 has occurred. When the NFC tag 200 receives a response request via the antenna unit 211 for checking the connection of wireless communication that is transmitted from the portable terminal 300 at a set interval (for example, 10-second interval) as described above, the NFC tag 200 may output a notification signal to the MFP 100. Moreover, when there is a Read request for the NFC tag 200, the IC chip 212 of the NFC tag 200 causes password-authentication information that includes a user ID and a password that is included in the Read request to be stored in the non-volatile memory.

(Step S202)

The system-control unit 120 determines whether or not user authentication was successful.

In this case, the system-control unit 120 reads password-authentication information that includes a user ID and password that is written in the NFC tag 200, and instructs the authentication-management unit 116 to perform user authentication. At this time, the authentication-management unit 116 performs user authentication by comparing the password-authentication information that is received from the system-control unit 120 and password-authentication information that is registered in the HDD 104, for example.

When the authentication-management unit 116 confirms that the password-authentication information matches, the system-control unit 120 determines that user authentication is successful (step S202: YES), and processing moves to step S203.

However, when the authentication-management unit 116 does not confirm that the password-authentication information matches, the system-control unit 120 determines that user authentication is not successful (step S202: NO), and processing ends. In this case, the system-control unit 120 may instruct the panel-operation-control unit 118 to display a warning on the panel unit 103 that user authentication is failure.

(Step S203)

The system-control unit 120 acquires the current power-supply mode.

In this case, the system-control unit 120 acquires from the power-supply-control unit 117 whether the current power-supply mode is the power-saving mode or the power-supply-OFF mode.

(Step S204)

The system-control unit 120 writes the power-supply-mode information that corresponds to the acquired power-supply mode to the NFC tag 200.

In this case, when the power-supply mode that is acquired from the power-supply-control unit 117 is the power-saving mode, the system-control unit 120 writes power-supply-mode information to the NFC tag 200 that indicates that the power-supply mode is the power-saving mode. However, when the power-supply mode that is acquired from the power-supply-control unit 117 is the power-supply-OFF mode, the system-control unit 120 writes power-supply-mode information to the NFC tag 200 that indicates that the power-supply mode is the power-supply-OFF mode.

(Step S205)

The system-control unit 120 determines whether or not there is a Write request.

In this case, when the communication-control unit 112 has not received a notification signal from the NFC tag 200 that notifies when a state change occurs, the system-control unit 120 determines that there is no Write request (step S205: NO).

However, when the communication-control unit 112 has received a notification signal from the NFC tag 200 that notifies when a state change occurs, the system-control unit 120 determines that there is a Write request (step S205: YES), and processing moves to step S206.

The system-control unit 120 may determine whether or not there is a Write request by determining whether or not information is written to the NFC tag 200 at set intervals (for example, 10-second intervals) when there is a Read request for the NFC tag 200 in step S201.

(Step S206)

The system-control unit 120 determines whether or not there is a power-saving-cancellation request.

In this case, when the system-control unit 120 reads information that is written in the NFC tag 200 and that information is contents that indicate a power-saving-cancellation request, the system-control unit 120 determines that the information is a power-saving-cancellation request (step S206: YES), and processing moves to step S207.

However, when the system-control unit 120 reads information that is written in the NFC tag 200 and that information is contents that indicate a power-supply-ON request, the system-control unit 120 determines that the information is not a power-saving-cancellation request (step S206: NO), and processing moves to step S208.

(Step S207)

The system-control unit 120 instructs power-saving return.

In this case, the system-control unit 120 instructs the power-supply-control unit 117 to switch to power-saving return.

At this time, the power-supply-control unit 117 switches from the current power-saving mode to the normal mode.

(Step S208)

The system-control unit 120 instructs Power-supply ON.

In this case, the system-control unit 120 instructs the power-supply-control unit 117 to switch to power-supply ON.

At this time, the power-supply-control unit 117 switches from the current power-supply-OFF mode to the normal mode.

(Step S209)

The system-control unit 120 determines whether or not radio waves are received.

In this case, when the system-control unit 120, via the communication-control unit 112, checks the state of the NFC tag 200 at set intervals (for example, 10-second intervals), and the IC chip 212 is in an active state, the system-control unit 120 determines that the NFC tag 200 is receiving radio waves (step S209: YES).

However, when the system-control unit 120, via the communication-control unit 112, checks the state of the NFC tag 200 at set intervals (for example, 10-second intervals), and the IC chip 212 is not in an active state, the system-control unit 120 determines that the NFC tag 200 is not receiving radio waves (step S209: NO). Then, processing moves to step S210.

In other words, the NFC tag 200 operates using radio waves from the portable terminal 300 as an energy source, so when the portable terminal 300 is set at a position over the NFC tag 200, the NFC tag 200 is able to receive radio waves that are constantly transmitted from the portable terminal 300.

In this way, when the NFC tag 200 is receiving radio waves, the system-control unit 120 continues the determination process in step S209, so it possible to maintain the normal mode of the power-supply control unit 117. In other words, while the portable terminal 300 is set at a position over the NFC tag 200, it is possible to use the MFP 100.

During a state change when transmitting a response to a response request from the portable terminal 300, the NFC tag 200 may output a notification signal via the I/F 201. This state change accompanies the response for checking the connection of wireless communication that is transmitted at a set interval (for example, 10-second interval) described above from the portable terminal 300. In this case, the system-control unit 120 can determine that radio waves are being received by checking that notification signal.

(Step S210)

The system-control unit 120 determines whether or not a set amount of time has elapsed.

In this case, when the measured value of a timer that is started when it is determined that the NFC 200 is not receiving radio waves is not greater than a set amount of time (for example, 20 seconds), the system-control unit 120 determines that a set amount of time has not elapsed (step S210: NO).

However, when the measured value of a timer that is started when it is determined that the NFC 200 is not receiving radio waves is greater than a set amount of time (for example, 20 seconds), the system-control unit 120 determines that a set amount of time has elapsed (step S210: YES), and processing moves to step S211.

In this way, the system-control unit 120 determines whether or not a set amount of time has elapsed from when it is determined that the NFC tag 200 is not receiving radio waves. Therefore, it is possible to avoid an interruption in processing even when the portable terminal 300 is mistakenly separated from the NFC tag 200 and then the portable terminal 300 is quickly returned to a position over the NFC tag 200.

(Step S211)

The system-control unit 120 gives an instruction to return to the power-supply mode before the instruction in step S207 or step S208.

In this case, when a power-saving return instruction is given to the power-supply control unit 117 in step S207, the system-control unit 120 instructs the power-supply-control unit 117 to return to the power-saving mode.

As a result, the power-supply-control unit 117 switches to the power-saving mode.

However, when a power-supply-ON instruction is given to the power-supply control unit 117 in step S208, the system-control unit 120 instructs the power-supply-control unit 117 to return to the power-supply-OFF mode.

As a result, the power-supply-control unit 117 switches to the power-supply OFF mode.

Here, the system-control unit 120 may store the contents of the power-supply mode that is acquired from the power-supply-control unit 117 in step S203 in the RAM 113, and may acquire the previous power-supply mode from the contents of the power-supply mode that is stored in the RAM 113. Alternatively, the system-control unit 120 may acquire the previous power-supply mode from power-supply-mode information that is written in the NFC tag 200.

In this way, in this embodiment, when there is writing of power-supply-mode-switch-request information included in a Write request from a portable terminal 300 for which user authentication is complete to a NFC tag 200 (wireless tag), the system-control unit 120 instructs the power-supply-control unit 117 to switch to the normal mode based on the power-supply-mode-switch-request information. Then, when the portable terminal 300 is separated from the NFC tag 200 (wireless tag), the system-control unit 120 instructs the power-supply control unit 117 to return to the power-supply mode before the instruction.

As a result, when, for example, the portable terminal 300 comes close to the NFC tag 200 (wireless tag), by the power-supply-control unit 117 switching to the normal mode it becomes possible to use the MFP 100 (electronic apparatus). Then, when the portable terminal 300 is separated from the NFC tag 200 (wireless tag), the power-supply-control unit 117 returns from the normal mode to the power-supply mode before the instruction, so it becomes impossible to use the MFP 100 (electronic apparatus). As a result, it is possible to prevent improper use by a third party, and it is possible to prevent leaking of confidential documents that are stored in the HDD 104 (storage device).

Figure 4:
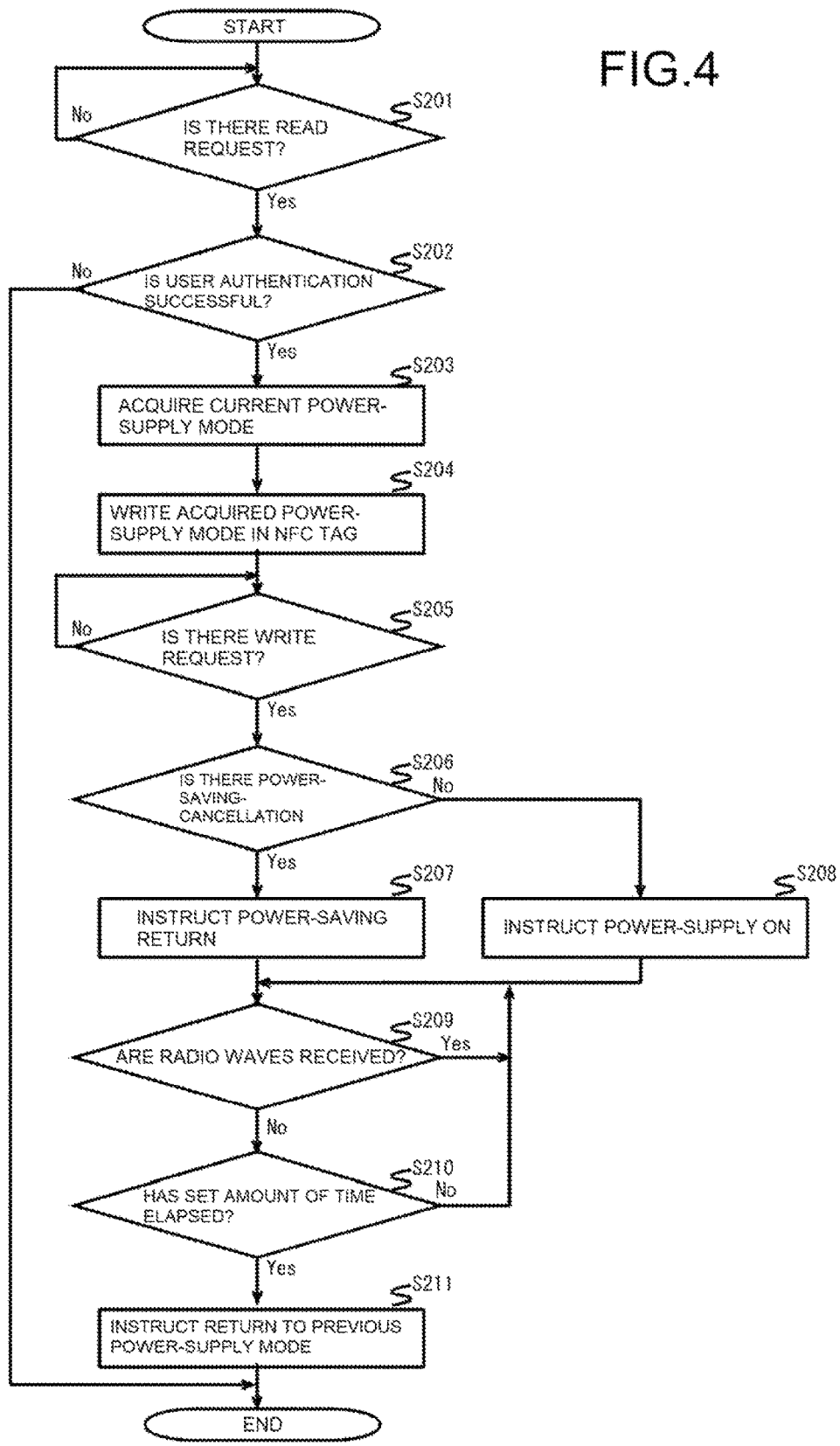
FIG. 4 illustrates steps of processing on the MFP side in FIG. 1.

The system-control unit 120 may perform the processing in steps S203 to S204 illustrated in FIG. 4 after step S211 when the power-supply-control unit 117 returns to the power-supply mode before the instruction in step S207 or step S208.

As a result, when the portable terminal 300 is set at a position over the NFC tag 200, the time for switching the power-supply mode of the MFP 100 to the normal mode can be shortened more than in the processing illustrated in FIG. 4.

Moreover, the system-control unit 120 may instruct the power-supply-control unit 117 to switch to power-saving cancellation or power-supply ON only by a power-saving-cancellation request or power-supply-ON request that is included in a Write request from the portable terminal 300 to the NFC tag 200.

Furthermore, every time the power-supply mode is switched between the power-saving mode and the power-supply-OFF mode, the system-control unit 120 may write the power-supply-mode information for the power-supply mode after switching in the NFC tag 200.

The power-saving mode made also be set beforehand to a low-power mode or sleep mode.

Moreover, the system-control unit 120 may instruct the power-supply-control unit 117 to switch from the normal mode to the power-saving mode when there is a no-operation state for a set amount of time, and further instruct the power-supply-control unit 117 to switch to the power-supply-OFF mode when the no-operation state continues for a set amount of time.

The system-control unit 120 may also instruct the power-supply-control unit 117 to switch from the normal mode to the low-power mode when there is a no-operation state for a set amount of time. Moreover, the system-control unit 120 may further instruct the power-supply-control unit 117 to switch to the sleep mode when the no-operation state continues for another set amount of time. Furthermore, the system-control unit 120 may further instruct the power-supply-control unit 117 to switch to the power-supply-OFF mode when the no-operation state continues for yet another set amount of time.

In an imaging apparatus of typical technology described above, the power supply of a digital camera as the imaging apparatus may be controlled to automatically turn ON by non-contact communication between a wireless tag that is mounted on the digital camera and a portable terminal such as a smart phone or the like as an external apparatus.

When this kind of technology that is capable of performing control for automatically turning ON the power supply of an imaging apparatus is applied to an imaging apparatus on which a wireless tag as described above is mounted, it is considered to be possible to automatically perform control or the like for turning ON the power supply of the imaging apparatus by wireless communication between a portable terminal such as a smart phone or the like and the wireless tag.

Incidentally, in the image forming apparatus described above, there are cases in which confidential documents and the like may be stored in a storage device such as a HDD (Hard Disk Drive) or the like. In this case, even though it may be possible to perform control to automatically turn the power supply of the image forming apparatus ON, forgetting to turn the power supply OFF may occur. In a state like this in which the power supply of the image forming apparatus is not turned OFF, a third party may use the image forming apparatus without authorization, and there is a possibility that confidential documents that are stored in a storage device such as a HDD or the like will be leaked.

With the electronic apparatus and non-transitory computer-readable recording medium according to the present disclosure, it is possible to prevent unauthorized use by a third party, so it is possible to prevent leakage of confidential documents or the like that are stored in a storage device.

In this embodiment, the case in which an electronic apparatus according to the present disclosure is applied to a MFP 100 is explained, however, the embodiment is not limited to a MFP 100, and it is possible to apply the electronic apparatus to another image forming apparatus such as a printer or multifunctional printer and the like, or to an information apparatus such as a PC (personal computer) and the like.

What is claimed is:

1. An electronic apparatus comprising:
   a wireless tag that stores information;
   a memory;
   a power-supply-control unit that controls a power-supply mode including a normal mode and a plurality of modes other than the normal mode; and
   a system-control unit that instructs the power-supply-control unit to switch the power-supply mode from a current power-supply mode to the normal mode based on the information when the current power-supply mode is one of the plurality of modes; wherein
   the normal mode is a mode in which power is supplied to each of a plurality of parts of the electronic apparatus and allows use of functions of the electronic apparatus;
   each of the plurality of modes is a power supply modes in which power supply to at least one part of the plurality of parts is stopped, and at least one of the at least one part to which power is stopped is different among the plurality of modes such that power consumption is different among the plurality of modes; and
   the system-control unit
   acquires, in response to a read request that is transmitted from a user-authenticated portable terminal, the current power-supply mode of the power-supply-control unit, stores power-supply-mode information corresponding to the acquired current power-supply mode in the memory, writes a power-supply-mode information that corresponds to the acquired power-supply mode to the wireless tag, transmits the power-supply-mode information written in the wireless tag to the portable terminal, and
   when there is writing of power-supply-mode-switch-request information that corresponds to the power-supply-mode information written in the wireless tag and that is included in a write request from the portable terminal to the wireless tag, the system-control unit instructs the power-supply-control unit to switch to the normal mode by the power-supply-mode information written in the wireless tag based on the power-supply-mode-switch-request information, and when the portable terminal is separated from the wireless tag, instructs the power-supply-control unit to return to the power-supply mode in use before the instruction by acquiring the power-supply-mode information stored in the memory.

2. The electronic apparatus according to claim 1, comprising
   an authentication-management unit; wherein
   when there is the read request, the system-control unit instructs the authentication-management unit to perform user authentication of password-authentication information that is included in the read request, and when the user authentication by the authentication-management unit is successful, the system-control unit performs said steps of acquiring the current power-supply mode of the power-supply-control unit and writing power-supply-mode information in the wireless tag, and based on the power-supply-mode-switch-request information for the power-supply-mode information that is written in the wireless tag from the portable terminal, instructs the power-supply-control unit to switch to the normal mode.

3. The electronic apparatus according to claim 2, wherein
   the power-supply-mode information includes contents that indicate a power-saving mode or power-supply-OFF mode;
   the power-supply-mode-switch-request information includes a power-saving-cancellation request or a power-supply-ON request; and
   the system-control unit,
   when the power-supply-mode-switch-request information is the power-saving-cancellation request, instructs the power-supply-control unit to switch to the normal mode based on the power-saving-cancellation request, and instructs the power-supply-control unit to switch from the normal mode to the power-saving mode based on the portable terminal becoming separated from the wireless tag; and
   when the power-supply-mode-switch-request information is the power-supply-ON request, instructs the power-supply-control unit to switch to the normal mode based on the power-supply-ON request, and instructs the power-supply-control unit to switch to the power-supply-OFF mode from the normal mode based on the portable terminal becoming separated from the wireless tag.

4. The electronic apparatus according to claim 1, comprising
   an authentication-management unit; wherein
   the system-control unit,
   when the power-supply-control unit returns to the power-supply mode before the instruction when the portable terminal is separated from the wireless tag, acquires the current power-supply mode of the power-supply-control unit and writes power-supply-mode information in the wireless tag; and
   when there is the read request, instructs the authentication-management unit to perform user authentication of password-authentication information that is included in the read request, and when the user authentication by the authentication-management unit is successful, instructs the power-supply-control unit to switch to the normal mode based on the power-supply-mode-switch-request information for the power-supply-mode information that is written in the wireless tag from the portable terminal.

5. A non-transitory computer-readable recording medium that stores a power-supply-control program executable by a computer that controls an electronic apparatus including a power-supply-control unit that controls a power-supply mode including a normal mode and a plurality of modes other than the normal mode; wherein the power-supply-control program includes:
   a first program code that causes the computer to store information in a wireless tag;
   a second program code that causes the computer to instruct a power-supply-control unit to switch the power-supply mode from a current power-supply mode to the normal mode based on the information when the current power-supply mode is one of the plurality of modes;
   wherein
   the normal mode is a mode in which power is supplied to each of a plurality of parts of the electronic apparatus and allows use of functions of the electronic apparatus;
   each of the plurality of modes is a power supply mode in which power supply to at least one part of the plurality of parts is stopped, and at least one of the at least one part to which power is stopped is different among the plurality of modes such that power consumption is different among the plurality of modes; and the second program code causes the computer to acquire, in response to a read request that is transmitted from a user-authenticated portable terminal, the current power-supply mode of the power-supply-control unit, store power-supply-mode information corresponding to the acquired current power-supply mode in a memory, write a power-supply-mode information that corresponds to the acquired power-supply mode to the wireless tag, transmit the power-supply-mode information written in the wireless tag to the portable terminal, and when there is writing of power-supply-mode-switch-request information that corresponds to the power-supply-mode information written in the wireless tag and that is included in a write request from the portable terminal to the wireless tag, causes the computer to instruct the power-supply-control unit to switch to the normal mode by the power-supply-mode information written in the wireless tag based on the power-supply-mode-switch-request information, and when the portable terminal is separated from the wireless tag, causes the computer to instruct the power-supply-control unit to return to the power-supply mode in use before the instruction by acquiring the power-supply-mode information stored in the memory.

* * * * *